June 3, 1958 — W. H. BENDALL — 2,836,984

DRIVE CHAIN

Filed May 16, 1957

INVENTOR.

Wilfrid H Bendall

United States Patent Office 2,836,984
Patented June 3, 1958

2,836,984

DRIVE CHAIN

Wilfrid H. Bendall, New York, N. Y.

Application May 16, 1957, Serial No. 659,528

15 Claims. (Cl. 74—249)

This invention relates generally to drive chains for mechanical power transmission purposes and particularly to the type industrially classified as "detachable chain."

Detachable chains, while well established in practise as evidenced by their continued use for farm implement and light conveyor drives since their origin some eighty years ago, have been largely superseded for the broad range of industrial chain drive requirements by more highly developed, higher capacity, but also more costly, types of chain construction such as the well known roller and inverted-tooth pivoted link chains. The continued use of detachable chain for the purposes noted, however, and its persistence substantially unchanged in design since its early industrial origin, may well be attributed to certain latent but as yet unrealized potentialities. These undoubtedly reside in the compelling simplicity and inherent economy of its design principle, embodying as it does a unitary chain link structure having integral pivot-bearing, sprocket engagement and interconnecting means, while retaining the advantage of ready detachability at each link portion.

As at present manufactured and used, however, the detachable chain is generally acknowledged to have design and performance limitations which drastically limit its mechanical endurance life under stress and thus, its allowable working load and speed, if satisfactory service life is to be realized. Even with close observance of the manufacturer's recommended load rating a relatively short working life is taken for granted and acceptable performance is largely predicated upon the low initial cost of manufacture, ease of replacement, and the circumstance that for agricultural implement uses, where operation is usually seasonal, a comparatively limited total number of working hours may represent several seasons use.

Nevertheless, in view of the intrinsic merit of the detachable chain it can be logically inferred that any design revision which would substantially increase its transmission capacity and working life, and thus adapt it to a broader range of industrial drive requirements while retaining its unique simplicity of design and low manufacturing cost, would greatly enhance its economic status and would constitute a new and particularly useful contribution to the art of chain driving. This a specific object of the present invention.

In meeting the increasing industrial requirement for efficient, quiet, high speed operation, an improved detachable chain must be capable of economical manufacture with considerably greater link pitch precision than appears to be feasible with designs of the prior art. It is accordingly an object of the present invention to provide a detachable chain having link members better adapted to precise manufacture than those of the prior art.

High tensile strength in relation to weight is an important requirement for the efficient drive chain operation, since destructive impact with the drive sprocket teeth is an inherent performance-limiting characteristic of all articulated link chains and such impact is directly proportional to the weigh of the chain. The conventional detachable chain is particularly deficient in this respect and it is a further object of this invention to provide a detachable chain construction with a substantially higher strength-to-weight ratio.

The characteristic "hook and bar" link pivot construction of conventional detachable chains, in which the "bar" end of each link member rotates as a journal inside the "hook" end of an interconnected link, does not provide the inherently low friction, cool-running link pivot bearing conditions necessary for durable high speed operation of such chains. It is a further object of this invention to provide a detachable chain having link pivot bearings capable of efficient and durable high speed operation without critical dependence on lubrication.

Operation on drive sprockets machined and finished to close dimensional tolerances is essential for efficient high speed chain performance. This does not appear to be feasible with conventional detachable chains. It is another object of this invention to provide a detachable chain adapted for efficient operation on such sprockets and further, on sprockets of industrially standardized tooth form which are in wide commercial availability and use for power transmission chains manufactured to high accuracy.

The "hook" portion of conventional detachable chain links is required to engage drive sprocket teeth with its external surface rotating in contact therewith under load. This is mechanically objectionable since it greatly increases drive friction and results in rapid wear of both chain and sprocket. It is thus another object of this invention to provide a detachable chain having link members which engage drive sprocket teeth without such objectionable frictional contact therewith under load.

Good drive shock resistance and resilient engagement with the drive sprockets are important desiderata in chain drives. The established detachable chain, in common with all articulated link chains currently in use, is inherently unsatisfactory in this respect. Provision for effective resilience and shock resistance at the tooth engagement points and thus, effective load distribution on the drive sprocket teeth, is a further object of the detachable chain construction of this invention.

Another object of this invention is to provide a detachable chain having a substantially wider operating speed and power range in a given pitch size than at present available, so that manufacture in less than half the usual range of link pitch sizes will cover the majority of industrial chain drive requirements.

Another object is to provide a detachable chain more conveniently detachable and more convenient to install in that it can be detached and replaced in a given drive without disturbing the sprocket centers or alignment of the drive members.

All of the foregoing and other objects and advantages of the detachable chain of this invention are further set forth in the ensuing parts of this specification and illustrated in the accompanying drawings in which like numerals designate like parts throughout, and in which Figure 1 is a view in perspective of a detachable link member of the chain of this invention.

Figure 1:
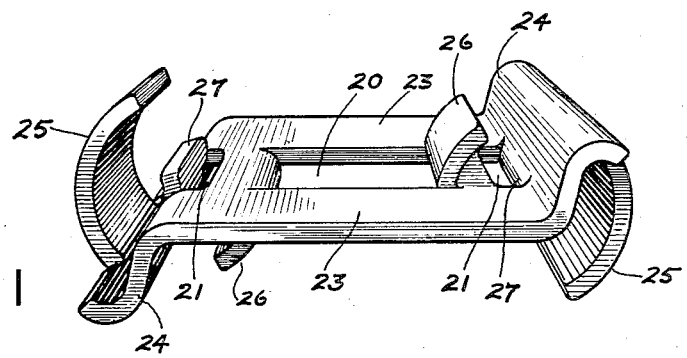

Referring to Fig. 1, which illustrates a link member of the chain of this invention, each such link member is constructed of flat sheet material of suitable thickness and has portions of the material pressed out of the plane thereof to provide a plurality of longitudinally spaced apertures comprising a central aperture 20 and end apertures 21, 21 adjacent to each end of the central aperture. Side portions 23, 23 of the link member extend longitudinally on each side of the apertures toward opposite end portions 24, 24 bent at equal and opposite angles out of the plane of the side portions and each terminating in narrower width, transversely curved external link pivotal portions 25, 25 which are adapted to engage the teeth of drive sprockets. The portions of the link structural material displaced as described above to provide the central aperture 20, are shaped to provide equal and oppositely disposed, transversely curved, internal link pivotal portions 26, 26, while the portions of the link material displaced to provide the end apertures 21, are shaped to provide equal and oppositely disposed, transversely curved, central link pivotal portions 27, 27.

Figure 2:
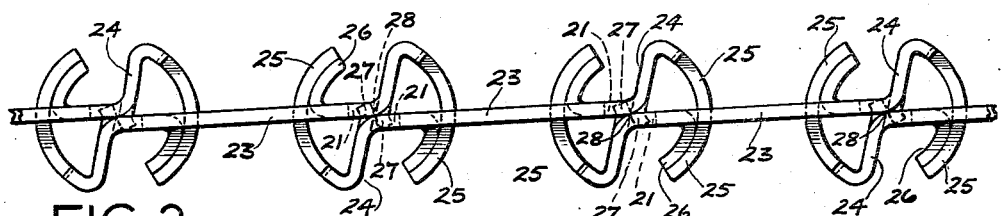
Figure 2 is a smaller scale, is a fragmentary side elevational view of the chain of this invention assembled from detachable link members of the form shown in Figure 1.
Figure 3:
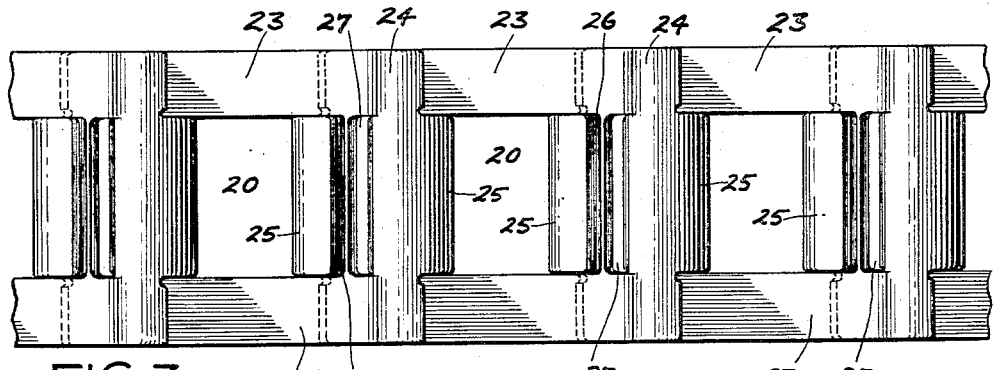
Figure 3 is a plan view of the assembled chain shown in Figure 2.

Referring now to Fig. 2, showing the above described link members assembled to form a chain, it will be seen that the members assemble with end portions overlapping each other substantially at the angularly bent link portions 24, and that with the links assembled thus each central pivotal portion 27, at each end of a link, enters an aperture 21 and abuts an identical pivotal portion of an interconnecting link end. Assembled thus the abutting pivotal portions 27, by reason of their opposed curvature, are in externally tangential bearing contact with each other at a transverse contact line, at 28, constituting the pivotal center of each pair of overlapped and interconnected link ends. The internal pivotal portions 26 and external pivotal portions 25, at each end of a link, are dimensioned to be in lightly sprung concentric guiding contact with each other about this pivotal center, and since each link end is an oppositely turned counterpart of its opposite end the transverse pivotal contact line at opposite ends coincides substantially with opposite surfaces of the sheet material at opposite ends of the link members. It is to be understood that both ends of the link members can be formed in the same direction if desired, the primary advantage of forming the ends in opposite directions being that in the latter case the total number of links comprising a drive chain can be either odd or even.

This novel form of link interconnection conveys the particular advantage that each link end has three points of load transmitting contact. These comprise the pivotal center portions 27, which carry the major part of the chain load when transmitting power, and the two supplementary bearing contact areas between each pair of pivotal end portions 25 and 26. The concentric coaction of these pivotal portions ensures the stability and guidance of the detachable ends of the link members when rotating into engagement with drive sprocket teeth and transmitting power at high speeds. As already noted, the pivotal portions 25 and 26 are initially in guiding contact with each other for this purpose and this contact serves the additional useful purpose of damping the link rotational inertia and reducing impact with the drive sprocket teeth during engagement. It also substantially reinforces the external pivotal end portions 25, when the latter are in load transmitting contact with the sprocket teeth.

It can be noted that the abutting center pivotal portions 27, comprise relatively short load-arm bearing members of greater comparative load capacity than the characteristic open hook ends of conventional detachable chains. Short, close-coupled link bearing members of this form facilitate use of a minimum weight of link structural material—which can be of hardened and tempered spring steel—in fabricating the members. The several coacting link pivotal portions can readily be sized in automatic forming machines to an acceptably close pitch dimension between the pivot centers at each end of the link member, the relatively thin material permitted by this design being easier to form and accommodating more economical manufacturing tolerances than is practicable with the heavier and more rigid material and inherently weaker structural design of conventional detachable chain links. The resulting higher link tensile strength for a given weight of material contributes significantly to the present objective of a higher chain strength-weight ratio which, as remarked above, is of critical importance to chain drive efficiency.

It should be observed that while the central pivot bearing portions 27, are shown in the drawings and described above as "transversely curved" their disclosure as such should be taken as exemplifying rather than limiting their permissible form since they may have any degree of angular sharpness, approaching a knife edge form, or roundness approaching a roller segment of constant radius, that may be suited to the purpose. In either case these central pivot members constitute a so-called "rocker" joint such as is used in certain inverted-tooth link chains, in contradistinction to the pin and bushing, or journal, type of joint used in conventional detachable and other chains. And while the link members of this invention could be modified to use an integral journal type of pivot bearing, the "rocker" type joint is considered preferable. It is simpler in construction, lighter in weight for a given bearing capacity, and cheaper to fabricate. It generates less frictional heat at high chain speeds. It is not critically dependent on lubrication yet is easier to lubricate effectively where lubrication is desirable. Conversely, it readily lends itself to dry lubrication and the link members of the form of this invention are well adapted to take coatings of various resilient material to increase joint durability, ease sprocket impact and protect against corrosive and erosive operating environments.

Conventional detachable chains are not adapted, either by design or manufacture, to high speed operation or to operation on accurately machined drive sprockets. The ability to operate on such sprockets, however, as stated earlier, is an important economic objective of the detachable chain of the present invention and it is preferably designed to operate on drive chain sprockets of the industrially standardized roller chain type which are in wide commercial availability and use. As is well known, such sprockets have a tooth form adapted to engage standard chain roller diameters corresponding to a given link pitch dimension and have a tooth profile designed to efficiently accommodate progressive link pitch elongation within economic wear limits. The link members of the detachable chain of the present invention accordingly are provided with central apertures dimensioned to clear the teeth of such sprockets and with concentrically curved link pivotal end portions substantially equal in effective diameter to the standard chain rollers of equivalent roller chain size for engaging the sprocket teeth.

Figure 4:
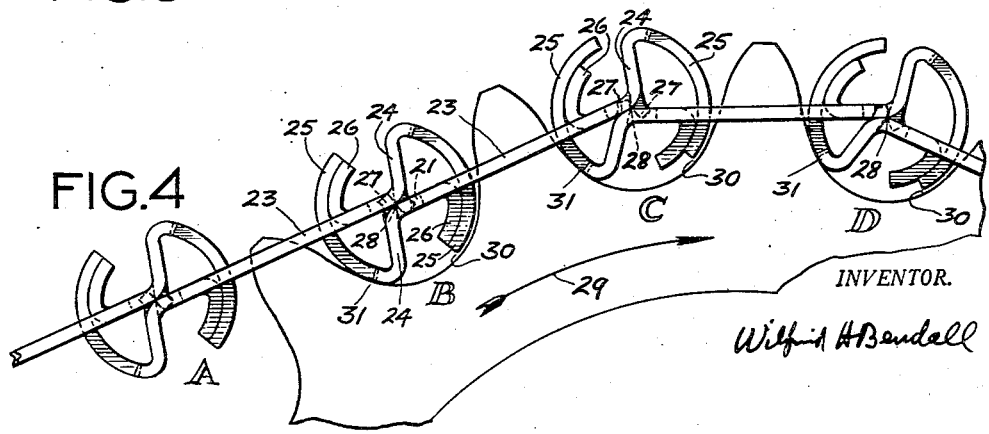
Figure 4 is a fragmentary side elevational view showing the assembled chain of this invention engaging a roller chain drive sprocket of industrially standardized tooth form.

This is illustrated in Fig. 4 which shows the chain of this invention under a working pull, engaging a fifteen tooth sprocket having teeth of standard roller chain tooth form. The sprocket is assumed to be rotating in the direction of the arrow 29 and the link member transmitting the working tension between link pivotal center positions designated A and B, is about to pivot at position B into full engagement with the sprocket. It will be noted that the effective diameter of the concentric link ends 25, is made slightly less than the root diameter of the sprocket tooth space to provide a working clearance 30, between the leading end of the link member and the adjacent sprocket tooth surface. This ensures that there will be no frictional contact with the sprocket at this point when the link pivots into position under load. The link between positions A and B will rotate about the pivot center at 28, transmitting the working load to the coacting pivotal members 27 at the following end of the link between positions B and C, and thence to the static bearing contact on the sprocket tooth at 31. This mode of operation, permitted by the present design, avoids the fundamental limiting characteristic of conventional detachable chains, in which the link ends grind against the sprocket tooth under load during engagement. It contributes substantially to the present objective of detachable chain performance comparable with that of the more highly developed roller and inverted-tooth drive chains.

It will be seen that the symmetrical design of the link ends permits operation in either direction of rotation, with drive sprockets engaging opposite sides of the chain in the same drive if desired, thus duplicating the useful spatial and directional versatility of the standard roller chain. In furtherance of the adaptability of the chain of this invention to economic operation on these sprockets the maximum transverse width of the link members is made equal to the individual strand clearance width on the standard multiple-width roller chain sprockets. This single width detachable chain can thus be used in separate parallel strand on these sprockets to transmit increased power without increasing the sprocket pitch diameter or using a larger pitch chain. Alternatively the chain link members of this invention can be fabricated with a transverse plurality of apertures and pivotal portions in the unit link structure, to engage such sprockets. It should be remarked, however, that individual strands of this chain, owing to their more resilient sprocket engagement, can be utilized efficiently in any multiple-width series without the complication and expense of matching the chain lengths in an effort to ensure even transverse distribution of the working load, such as is essential with the heavier, relatively rigid, standard roller chains.

This will be evident from further reference to Fig. 4 where it can be observed that the links engage the drive sprocket teeth at points 31, considerably inside the pivotal centers of the chain on the sprocket and thus, through a series of double cantilever members represented by the angularly bent link portions 24 and the narrower width end portions 25. It may again be observed here, that additional resilient support for the working contact of these end portions with the sprocket teeth is contributed by their bearing contact with the internal pivotal portions 26. The resilient driving contact thus effected with the sprocket teeth is of great value in absorbing shocks and ensuring good load distribution over the full sprocket engagement periphery. It should be noted, in contrast, that conventional drive chains are quite deficient in this respect since their effective elasticity, owing to the rigidity of both the method of link interconnection and the sprocket tooth contact, is negligibly small.

Computations show that detachable chains constructed in accordance with the foregoing specification and accompanying drawing can achieve a substantially higher strength-weight ratio than appears to be possible with available chain drive elements of established design. Equivalent pitch detachable chains of this invention may, for example, have approximately one-fourth the unit weight of the standard roller chain. This substantial reduction in weight particularly adapts this new chain for the increasing number of drive requirements where dynamic factors predominate. The specific weight reduction permitted by its construction reduces potential sprocket impact in the same proportion and doubles the allowable linear speed range and potential power transmission capacity, without exceeding the impact and stress values which experience has shown to be practical with articulated link chains. The large reduction in sprocket impact also ensures quieter high speed operation and the increased operating range conveys the economic advantage that manufacture in less than half the usual wide range of link pitch sizes will serve the majority of industrial chain drive requirements.

The structural and performance advantages of the chain of this invention, related above, are achieved without detracting from the desirable features of ease of link interconnection and detachability inherent in the detachable chain principle. Detachment in the present case is readily accomplished by lightly pressing any given pair of interconnected link ends axially towards and normally away from each other until the short central pivotal portions 27, clear the apertures 21, when further link separation sufficient to overcome a slight spring restraint at the tips of the external pivotal portions 25 completely releases the link ends. The amount of slack required in the drive strand to accomplish this with an installed chain is about fifteen percent of the link pitch dimension and will thus be normally available without disturbing the sprocket mountings or drive centers of the installation. It can be added that this is not possible with the established detachable chains.

While the detachable link member of this invention is disclosed as constructed of a single thickness of material, its structure may alternatively comprise two or more layers of lesser thickness to provide a still more resilient link member. It may also be provided with modified end portions adapted to engage drive sprockets of somewhat different tooth form. The link members may have portions of resilient materials clipped or bonded thereto for this purpose and to provide various drive characteristics, and, as is customary with detachable chains, numerous integral link extensions or attachments can be incorporated in the link structure to extend its use to materials conveyor and similar drive duties, where its improved power and speed range will be of value.

These modifications are cited to emphasize that the detachable chain of the present invention is not limited to the specific embodiment disclosed herein by way of example and that numerous such variations of size, shape, arrangement and processing of the link members come within the spirit of the invention and the scope of the appended claims.

I claim:

1. A drive chain comprising apertured link members disposed end to end, each of said link members having a plurality of concentrically curved link portions at both ends thereof, each of said ends comprising an externally concentric link portion passing through an aperture and engaging an internally concentric portion of an interconnected link, an internally concentric link portion engaging an externally concentric portion of said interconnected link, and a centrally located portion passing through an aperture and engaging a like portion of said interconnected link, each of said link portions being in load-transmitting engagement with said interconnected link portions.

2. A drive chain comprising apertured link members having pivotal centers at each end thereof arranged end to end with pivotally connected end portions, each of said link members having a plurality of apertures and a plurality of shaped link portions formed about said pivotal centers, said link portions comprising a portion shaped to pass through an aperture in an interconnected link and engage drive sprocket teeth, a supplementary portion shaped to engage an end portion of an interconnected link member, and a pivotal portion shaped to pass through a link aperture and engage a like portion of an interconnected link member.

3. A drive chain comprising apertured links of flat sheet material having portions of said material pressed out of the flat plane thereof to provide a plurality of apertures and a plurality of hook-shaped portions at each end thereof, said links being interconnected by said hook-shaped portions passing through the apertures of interconnected links and resiliently engaging hook-shaped portions of said interconnected links.

4. A drive chain comprising pivoted links of flat sheet material having portions offset from the plane of said material to provide a plurality of apertures and a plurality of hook-shaped pivotal portions at the ends thereof, said links being interconnected by said pivotal portions passing through apertures of interconnected links and resiliently engaging like portions of said interconnected links, said hook-shaped portions at opposite ends of each link being formed in opposite directions.

5. A drive chain comprising pivoted links of flat sheet material having portions offset from the plane of said material to provide a plurality of apertures and concentric hook-shaped portions at the ends thereof, each of said ends being interconnected for rotation about a common center with an end of an interconnected link by said hook-shaped portions passing through apertures and resiliently engaging like portions of interconnected links.

6. A drive chain comprising pivoted links of flat sheet material having portions offset from the plane of said material to provide a plurality of apertures and a plurality of external and internal pivotal portions at each end thereof, said pivotal portions comprising an external pivotal portion passing through an aperture and engaging an internal pivotal portion of an interconnected link, an internal pivotal portion engaging an external pivotal portion of an interconnected link, and a central pivotal portion passing through an aperture and engaging a like portion of an interconnected link, each of said pivotal portions being in resilient load-transmitting contact with pivotal portions of interconnected links and each end portion thereof being shaped to engage drive sprocket teeth.

7. A drive chain comprising interconnected link members having a pivotal center at each end thereof and having a plurality of transversely curved link portions formed about said pivotal centers comprising link portions shaped to engage drive sprocket teeth and supplementary link portions shaped to engage end portions of interconnected link members and further link portions shaped to engage like portions of interconnected link members at said pivotal centers.

8. A drive chain comprising apertured links arranged end to end with overlapping interconnected end portions, each of said links having a central aperture and an adjacent aperture at each end thereof and each of said end portions having a plurality of curved link portions adapted to pass through central and adjacent apertures of an interconnected link and resiliently engage like end portions of said link, each of said end portions being shaped to engage sprocket teeth.

9. A drive chain comprising apertured link members arranged end to end with identically shaped overlapping link end portions, each of said link members having central and end apertures and each of said end portions comprising transversely curved link portions passing through central and end apertures of interconnected link members and engaging transversely curved link portions of said interconnected link members.

10. A drive chain comprising pivoted links of flat sheet material having portions offset from the plane of said material to provide a plurality of apertures and a plurality of pivotal portions at each end thereof, said links being arranged end to end with overlapping end portions and pivotal portions passing through apertures of interconnected links, the pivotal portions at opposite ends of said links being formed in opposite directions and the pivotal centers thereof lying on opposite sides of said sheet material.

11. A drive chain comprising pivoted links of flat sheet material each having a plurality of rectangular apertures and having transversely curved link portions at the edges of said apertures and transversely curved portions at each end of the links, said transversely curved portions comprising concentric link pivotal and end portions adapted to interlock with like pivotal and end portions of interconnected links and engage drive sprocket teeth.

12. A chain link member constructed of flat sheet material having a central aperture and an aperture at each of its end portions and having transversely curved portions of the material comprising identical link pivotal members at opposite transverse edges of the apertures and at opposite ends of the link member.

13. A chain link member constructed of flat sheet material having a central aperture and an aperture at each end thereof and having transversely curved portions of said material at the edges of the apertures and at the end portions of the link comprising concentric pivotal members at each end of the link.

14. A chain link member constructed of flat sheet material having a plurality of transversely curved end portions and a plurality of rectangular apertures, each of said apertures having a transversely curved portion at an edge thereof, said curved portions comprising a central pivotal member and a concentric internal and external pivotal member at each end of the link.

15. A chain link member constructed of flat sheet material having a plurality of rectangular apertures and a plurality of transversely curved portions at opposite ends thereof, said curved portions comprising identically shaped and oppositely disposed link pivotal members at said opposite ends.

References Cited in the file of this patent

UNITED STATES PATENTS

| | | |
|---|---|---|
| 1,107,808 | Locke | Aug. 18, 1914 |
| 1,403,674 | Dull | Jan. 17, 1922 |
| 1,555,577 | Horner | Sept. 29, 1925 |
| 2,679,762 | Paulsen | June 1, 1954 |